9689X
S. CRAM.
HYDROSTATIC AND PNEUMATIC BREAKER.
Patented June 2, 1836.
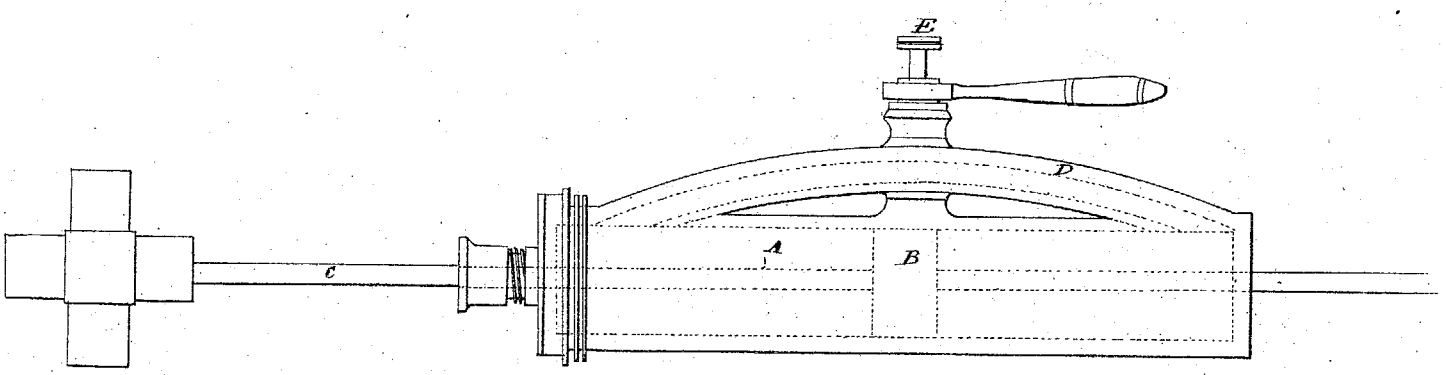

Smith Crane. of the City of New York.

Letters Patent.

The schedule referred to in these Letters Patent and making part of the same containing a description in the words of the said Smith Crane himself of his Improvement in the Cylindrical Hydrostatic and Pneumatic Breaker.

---

Be it known that I Smith Crane of the City, County, and State of New York, have made an improvement in the useful arts being a method of stopping and retarding motion in machinery by the resistance of fluids confined in chambers called "Crane's Cylindrical Hydrostatic & Pneumatic Breaker" which is described as follows, reference being had to the annexed drawings of the same making part of this specification.

A cylindrical chamber A. is constructed in which a Piston B. moves having a piston rod C extending from one side or from both sides of the piston through the head or heads of the end or ends of the cylinder which may be of any convenient diameter from one inch to one foot according to the momentum of the machine intended to be stopped or retarded in its motion. From one side of this cylinder and near both ends of it arises a tube D in a semi elliptical curve having a stop cock near each termination thereof in said cylinder so constructed as to be easily turned and thereby the fluid within the cylinder and tube be prevented from moving through said tube whichever of said cocks may be turned. The ends of this tube being near the ends of the cylinder the piston must always be between them and when the piston moves towards one end of the cylinder it drives the fluid between it and that end out of the space between them through the elliptical tube into the space between the other side of the piston and the other end of the cylinder; and when the piston moves back towards said other end it drives the water or other fluid out from the space between them through the tube into the former end of the cylinder, and thus as often as the piston is moved, the fluid is driven through said tube from one into the other end of the cylinder alternately But by turning the stop cock at either end of the tube the motion of the fluid is stopped entirely or retarded according as the cock is turned to close the passage entirely or only in part. This cylinder being firmly fixed to some standing part of a fixed machine or to some fixed part of a moving Machine so that the piston rod, one tie may be connected with the moving part of the Machine intended to be stopped or retarded in its motion whether it be a railway carriage of any kind or other machine within the above description as hereinafter mentioned, then it will be obvious that on turning the said cocks or either of them, the course of the fluid whether water or air or other fluid will be stopped or retarded in its motion as aforesaid and thereby the piston be stopped in its action or retained according as the cocks both or one of them may be so turned as to stop the water or other fluid entirely or only to retard its motion and by necessary consequence if the piston rod fixed for example to a crank in the axle of a rail road carriage be strong enough the motion of the said axle will be stopped or retarded as aforesaid, the said cocks or cock being made to turn with ease by many and various mechanical means.

The fluid may be introduced into said chamber by valves opening inwards in any convenient way, or it may be let in through either of the cocks or a single cock in the elliptical tube by making a screw hole into said cocks or cock down into the perforation of the same.

Instead of the two cocks before mentioned one cock may be used which will answer the object in view, and water is to be admitted to the cylinder the cock can be withdrawn see E. in Fig 1. the said Crane in the next place describes the principle of his said improvement so as to distinguish the same from other inventions of the like kind.

This principle consist in the construction of a chamber having a piston moving therein continually while the machinery or parts of machinery intended to be stopped or retarded in their motion is kept moving and thereby moving the water or fluid in the said chamber through a connecting tube (said cylinder piston and tube being constructed substantially as aforesaid) in combination with any machine or part of a machine designed to be stopped in its operation by the stopping or retarding of the motion

X9689

235.

of water, air or other fluids in such chamber and tube substantially as above described.

Witnesses

Mr. P. Elliot

Joseph Bourdin

Smith Cram

Exd.

Clfl 900 wds

Drawing